Dec. 29, 1964  J. C. CAMPBELL  3,163,180
PLUNGER CONSTRUCTION FOR FLUID FLOW CONTROL VALVE
Filed May 6, 1963  2 Sheets-Sheet 2

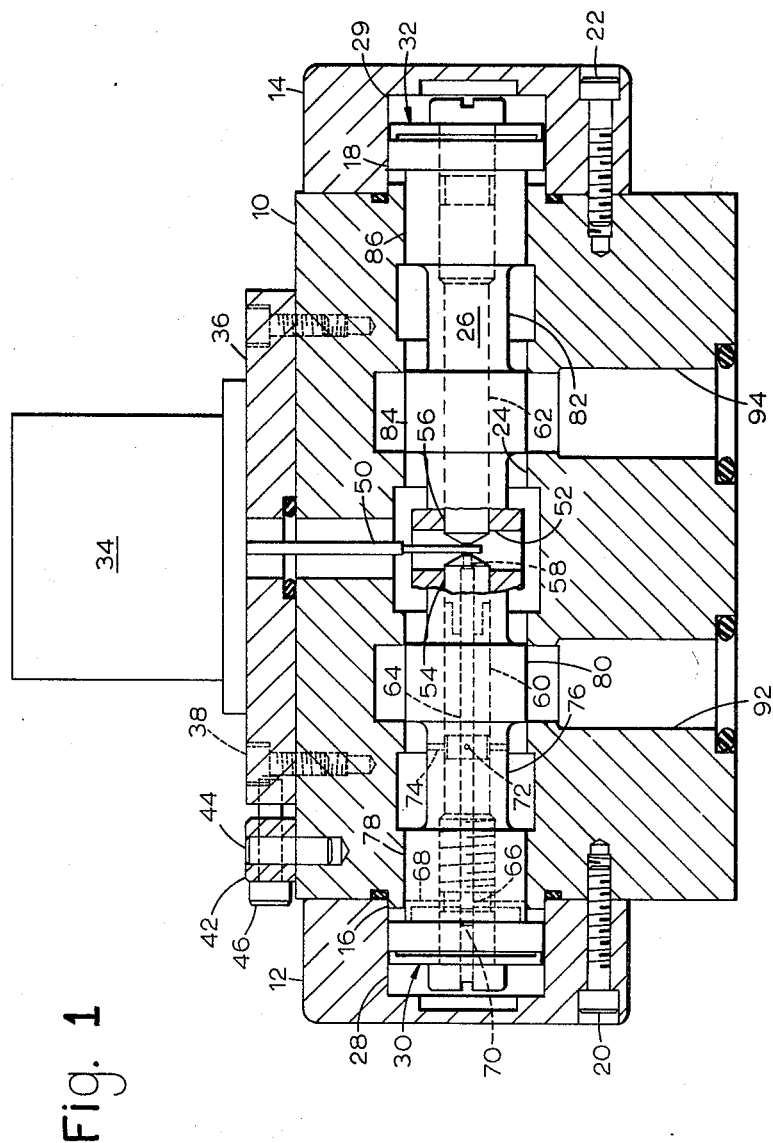

United States Patent Office 3,163,180
Patented Dec. 29, 1964

3,163,180
PLUNGER CONSTRUCTION FOR FLUID FLOW
CONTROL VALVE
John C. Campbell, Cincinnati, Ohio, assignor to The Cincinnati Milling Machine Co., Cincinnati, Ohio, a corporation of Ohio
Filed May 6, 1963, Ser. No. 278,000
6 Claims. (Cl. 137—625.62)

The present invention relates to fluid control valves and more particularly to a valve plunger construction adapted for use in two stage servo valves in which the valve plunger is shifted by a slight fluid pressure differential between piston diameters thereon.

In two stage servo valves of the type which employ a deflectable member, sometimes called a flapper, to control the discharge of fluid from nozzles in such a manner that a fluid pressure differential is produced in the supply lines to the nozzles to shift a control plunger, it is important to utilize short fluid control lines to insure a small amount of contained fluid therein for the best sensitivity and valve response. One way to shorten these fluid lines is to place the nozzles in the plunger itself in an opposing direction with the flapper inserted therebetween and deflectable toward and away from each of the nozzles. The back pressure behind each of the nozzles then can be transmitted directly to an enlarged diameter portion or piston of the plunger on the inside face of that piston without a reversal of direction in the communicating passage. That is, the fluid passages from the nozzles can extend directly behind the nozzles to their respective pistons to produce forces at each end of the valve plunger pushing outward away from the nozzles and the center of the plunger. The valve body in such an arrangement must have a plunger diameter extending between two larger piston diameters. In the manufacture of these valve bodies heretofore, their plunger and piston diameters have been required to be of extreme concentricity to prevent drag on their plungers as they were shifted therein since any drag on the plungers directly impairs the operating response of the valves. In the manufacture of such valve bodies, the holding of the bores concentric is a very difficult operation since the two larger diameters are separated by a smaller diameter and all three may not be machined from a common boring spindle in a single setup. Also, the plunger in such a valve must be comprised of several members assembled in the valve body and these members must be carefully and accurately aligned at assembly or the plunger itself may not have concentric portions.

It is, therefore, an object of this invention to provide a valve plunger construction which enables the plunger to compensate itself to account for a lack of concentricity between two or more bore diameters in a valve body.

It is also an object of this invention to provide a servo valve employing an enlarged piston diameter at each end of a plunger diameter wherein the tolerances of concentricity between diameters may be greater than has been acceptable heretofore.

It is a further object of this invention to provide a valve plunger construction which allows for ease of assembly in the valve body without the need of careful alignment of parts forming enlarged pistons at each end thereof.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention utilizes an annular piston loosely received over a valve spool for limited transverse movement to accommodate eccentricity between the bore in which the spool slides and the cylinder bores at each end thereof in which the pistons slide. The pistons are retained on the spool by members fixed to the outer ends of the spool and which are smaller than the cylinder and piston diameter. Each of the retaining members has a flat band or annular area around one side near its outer edge adapted to engage tightly against the piston adjacent thereto. The side face area of the retaining member inward from this flat surface area is recessed therefrom and fluid under pressure from behind the piston is in communication with this recessed area to produce a force which reduces the contact force between the piston and retaining member at the flat surface such that the piston can slip easily in the direction transverse to the spool and retaining member. The pistons and retaining members together transmit the forces at the ends of the spool which produce movement of the spool to control fluid flow through the valve.

A clear understanding of this invention can be obtained from the following detailed description in which reference is made to the attached drawings wherein:

FIG. 1 is a longitudinal section view of a two stage servo valve.

Figure 3:
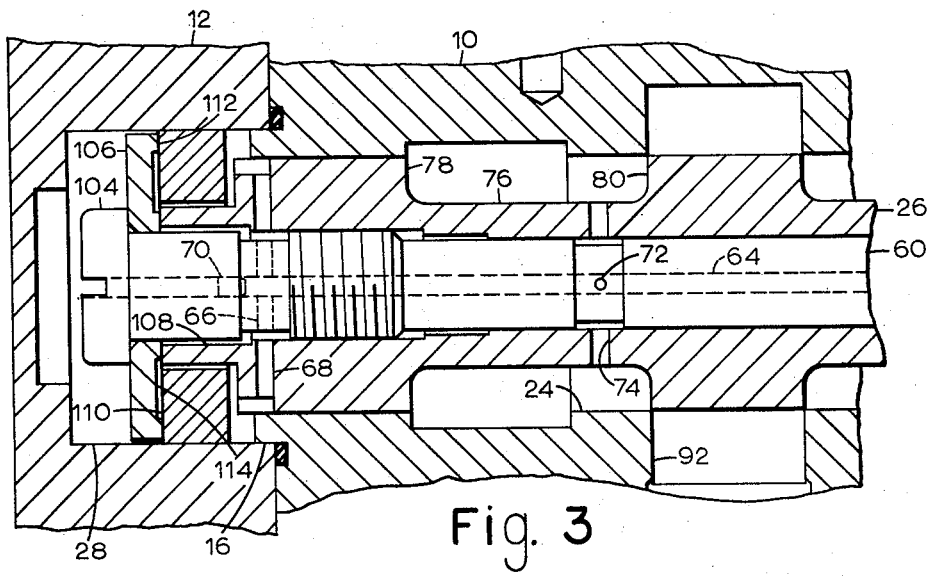
FIG. 3 is an enlarged longitudinal section view of one end of the plunger of the valve of FIG. 1.

As shown in FIG. 1, the servo valve is enclosed in a body 10 including a pair of end caps 12, 14 which are fixed to the body 10 over the locating diameters 16, 18, by means of screws 20, 22. A control bore 24 is machined through the body 10 and a spool 26 is slidably fitted therein for axial movement to control the flow of fluid through the valve. Piston diameters 28, 29 are formed in the end caps, 12, 14, and these have a diameter greater than the control bore 24. A piston assembly 30, 32 is fixed on each end of the spool 26 to effect movement of the spool in the body 10. These piston assemblies 30, 32 will be described in detail subsequently herein. A torque motor 34 is attached to a mounting plate 36 on top of the body 10 and is secured thereto by screws 38. An adjusting block 42 is fixed on top of the body 10 at one end of the plate 36 by a pin 44. A pair of screws 46 extend through the block 42 and into the plate 36 to provide means for adjusting the torque motor 34 slight amounts along the body 10 when the screws 38 are loosened. A flapper 50 extends from the torque motor 34 and into an opening 52 through the spool 26. The flapper 50 is swung one way and the other in the axial direction of the spool 26 by operation of the motor 34. A pair of nozzle members 54, 56 are received in the spool 26 on either side of the opening 52 and each has an orifice 58 directed toward the flapper 50 therebetween. Each of the nozzles 54, 56, is held in place in the spool 26 by a member 60, 62, respectively, which members are threaded into the spool 26 as shown in FIG. 3. A fluid passage 64 extends through the member 60 from the orifice 58 and is in communication with the area behind the piston assembly 30, through a transverse opening 66 in the member 60 and a set of transverse ports 68 through the spool 26. The passage 64 beyond the opening 66 is stopped by a plug 70 driven therein. The passage 64 in the member 60 is also connected through a restrictive opening 72 and ports 74 to the outside area of the spool 26 at a cannelure 76 between a pair of spool lands 78, 80. A passage like the passage 64 in the other member 62 is similarly connected to both the area behind the piston 32 and to a cannelure 82 between a pair of lands 84, 86 from the nozzle 56 although to simplify the drawings this arrangement is not shown since it is identical to that described for the member 60, the spool 20 being symmetrical on either side of the flapper 50.

Figure 2:
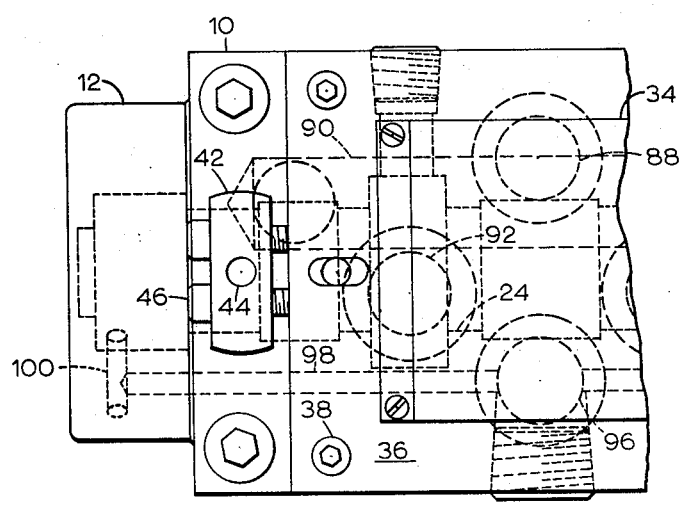
FIG. 2 is a partial top view of the valve of FIG. 1 with fluid connecting passages shown in phantom.

As shown in FIG. 2, a pressure fluid passage 88 is connected by interdrilling 90 to each of the cannelures 76 and 82. Therefore fluid under pressure is connected into the passage 64 in each of the members 60, 62 and is discharged from each of the nozzles 54, 56 toward the flapper 50 which is closely spaced therefrom. When the flapper is spaced similarly from both nozzles 54, 56 the back pressure in the passage 64 behind each is the same and a resulting balanced fluid force is produced behind the piston assemblies 30, 32 to hold the spool 26 in the center position shown with the lands 80 and 84 just blocking the motor operating fluid passages 92, 94. If the flapper is swung slightly leftward, the pressure within the passage 64 in the member 60 is increased while the pressure in the same passage in the other member 62 is decreased. Therefore, a force difference between the piston assemblies 30, 32 is created and the spool 26 is shifted to follow the swing of the flapper 50. A swing of the flapper 50 rightward produces a similar following movement of the spool 26 rightward. Fluid discharged from the nozzles 54, 56 into the opening 52 is removed therefrom through an exhaust passage 96 in the body 10. The exhaust passage 96 (FIG. 2) is also connected to drain any fluid leakage from the outer ends of the piston diameters 28, 29 beyond the piston assemblies 30, 32 by means of an arrangement of drilled passages 98, 100.

The construction of the piston assembly 30 is shown in detail in FIG. 3. The other piston assembly 32 is identically constructed at the other end of the spool 26. As shown, the member 60 has a head 104 thereon which is drawn firmly against a retaining member 106 to hold it fixed on the end of the spool 26. A reduced diameter portion 108 of the spool 26 extends outward from the land 78 to the retaining member 106 and an annular or ring shaped piston 110 is loosely received thereover for both limited axial and transverse movement. The piston 110 slidably fits into the bore diameter 28 of the end cap 12. Fluid under pressure from the passage 64 is applied behind the piston 110 by the opening 66 and ports 68 to force the piston 110 against the retaining member 106 where it contacts a flat annular surface 112 of limited area extending completely around the outer edge of the side of the member 106 adjacent to the piston 110. An area 114 of the side face inside the ring area 112 is recessed from the flat area 112, and fluid under pressure is admitted to this area through the piston 110 and around the spool extension 108. This creates a fluid force between the piston 110 and member 106 which reduces the force of contact at the area 112, and the piston 110 is then able to move transversely relative to the spool 26 and retaining member 106 to adjust for any eccentricity between the piston diameter 28 and the control bore 24. The piston member 110 then in effect is floating transversely with respect to the spool 26. Since both piston assemblies 30, 32 are similarly constructed, the plunger mechanism moves axially through the valve body without adverse drag effects by a lack of exact concentricity between the diameters 24, 28, 29 of the valve body assembly.

While this invention has been described in connection with one possible form or embodiment thereof, it is to be understood that the present disclosure is illustrative rather than restrictive and that changes and modifications may be resorted to without departing from the spirit of the invention or the scope of the claims which follow.

What is claimed is:

1. In a fluid flow control valve including a member having a bore therethrough defining axially aligned first and second bore chambers, the first chamber having a smaller diameter than the second chamber, a control plunger received in the bore comprising:
   (a) a spool slidably received in the first chamber and extending into the second chamber,
   (b) a ring slidably received in the second chamber and loosely received over said spool,
   (c) a retaining member fixed on said spool in the second chamber and having
      (1) A flat annular surface around the outer edge of one side thereof adapted to engage a side of said ring tightly and
      (2) a recessed area radially inward from said flat annular surface on said one side thereof, and
   (d) means to connect fluid under pressure to the side of said ring opposite said retaining member to move said ring into forceful engagement against said flat annular area, said recessed area being in communication with the side of said ring opposite the retaining member through said ring member and around said spool to produce a force reducing the force of contact at said flat annular surface thereby to render said ring relatively freely movable in a direction transverse to said spool to accommodate eccentricity between said chambers.

2. The control plunger of claim 1 wherein:
   (a) the second chamber is at one end of said spool,
   (b) said spool has an end of reduced diameter extending into the second chamber,
   (c) said ring is loosely received over said reduced diameter end of the spool, and
   (d) said retaining member is fixed against said reduced diameter end of the spool.

3. In a fluid flow control valve including a body having a bore therethrough defining first and second bore chambers at each end of equal diameter and a third bore chamber therebetween of smaller diameter than the first and second chambers, a control plunger received in the bore comprising:
   (a) a spool slidably received in the third chamber and extending into the first and second chambers at each end,
   (b) a pair of rings, one of said rings slidably received in each of the first and second chambers and loosely received on said spool therein,
   (c) a pair of retaining members, one of said retaining members received on each end of said spool adjacent said rings in said first and second chambers and holding said rings on said spool, each of said rings having
      (1) a flat annular surface around the outer edge of the side thereof adapted to engage a side of the respective one of said rings adjacent thereto and
      (2) a recessed area radially inward from said flat annular surface and
   (d) means to connect fluid under pressure to each of said rings at the side thereof opposite to the respective retaining member to move said rings into forceful engagement against said flat annular areas, said recessed areas being in communication with the side of said rings opposite to said retaining members through said ring members and around said spool to produce forces reducing the force of contact at each of said flat annular surfaces thereby rendering said rings relatively freely movable in a direction transverse to said spool to accommodate eccentricity between said chambers.

4. The control plunger of claim 3 wherein:
   (a) said fluid pressure connecting means is a pair of passages through said spool each terminating at one of said rings on the side thereof opposite the respective retaining member,
   (b) said rings and retaining members in each of the first and second chambers define actuating pistons on the ends of said spool, and
   (c) means are included in the spool to create a difference in fluid pressure between said passages to produce unbalanced forces between said pistons to move said spool in a direction corresponding to the direction of unbalance of the forces applied to said pistons.

5. A fluid control valve comprising:
   (a) a body having a control bore therethrough and an actuating cylinder at each end of the control bore, each of said cylinders having a diameter greater than said control bore,
   (b) a valve spool slidably received through said control bore and extending into said cylinders at each end,
   (c) a piston slidably received in each of said cylinders and retained on the end of said spool in the respective cylinder, each of said pistons including
      (1) an annular retaining member fixed on an end of said spool and having a diameter smaller than said cylinder in which received,
      (2) a ring slidably received in the respective one of said cylinders and received loosely around said spool behind said retaining member for limited movement transverse to said spool, said ring and retaining member adapted to closely contact one another on the adjacent sides thereof,
   (d) means to apply fluid under pressure outward from said spool behind each of said pistons,
   (e) means to unbalance the fluid pressure behind said pistons to shift said spool in the direction of the piston to which greater pressure is applied.

6. The fluid control valve of claim 5 wherein:
   (a) said retaining member of each piston has
      (1) a narrow band around one side thereof adapted to engage tightly against said ring therebehind and
      (2) a recessed area radially inward from said narrow band adapted to remain spaced from said ring therebehind, and
   (b) said ring of each piston has an opening therethrough larger than the spool where received to permit fluid under pressure to be connected through said ring and around said spool to said recessed area to reduce the force of contact between said ring and retaining member.

References Cited in the file of this patent

UNITED STATES PATENTS 3,003,476   Thomas _____ Oct. 10, 1961